UNITED STATES PATENT OFFICE.

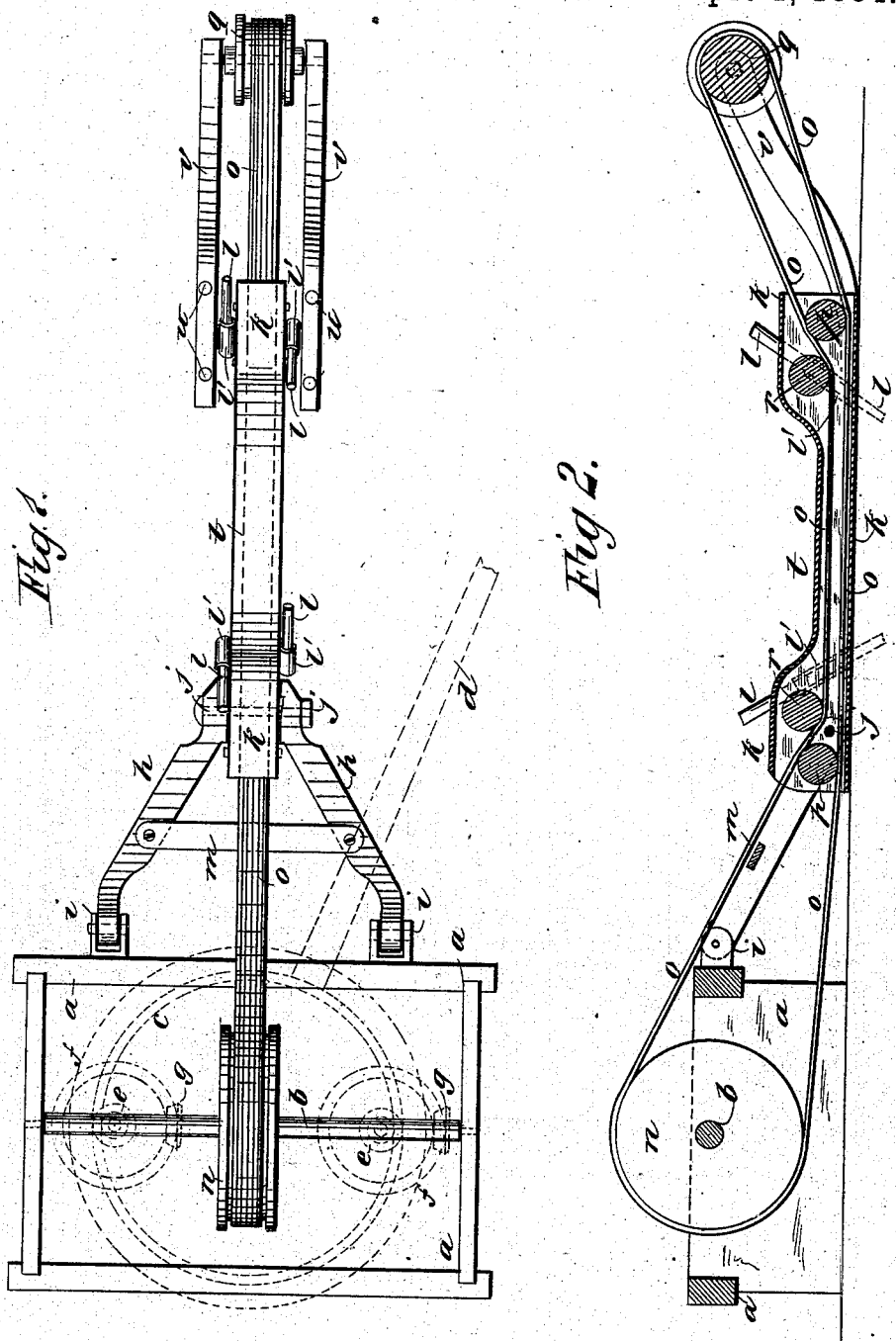

AUGUST ZASTROW, OF LA HARPE, ILLINOIS.

HORSE-POWER.

SPECIFICATION forming part of Letters Patent No. 296,099, dated April 1, 1884.

Application filed January 25, 1884. (No model.)

*To all whom it may concern:*

Be it known that I, AUGUST ZASTROW, of La Harpe, in the county of Hancock and State of Illinois, have invented certain new and useful Improvements in Horse-Powers, of which the following is a full, clear, and exact description.

The object of my invention is to provide a simple, inexpensive, strong, and durable arrangement of devices whereby the power may be taken from the main shaft of any ordinary horse-power and applied directly to the driving of thrashing or other machines by the use of a belt.

The invention consists in special constructions of the belt-casing with guide pulleys or idlers journaled to guide the belt clear of frictional contact with the ground or casing, and so as to permit the belt-casing to be depressed at the place where the animals pass over it in working the sweep, together with a hinged connection of said casing to the frame, and in the means for securing the casing to the ground to resist the strains of the moving belt, all as hereinafter fully described and claimed.

Reference is to be had to the accompanying drawings, forming part of this specification, in which similar letters of reference indicate corresponding parts in both the figures.

Figure 1 is a plan view of my improvements, and Fig. 2 is a central longitudinal sectional elevation of the same.

The letter $a$ indicates the frame of a horse-power, which latter may have any approved arrangement of gearing for driving a power-shaft, $b$. I show in dotted lines a master-wheel, $c$, to which the sweep $d$ (to which the animals are hitched) is fastened, said master-wheel gearing with the shaft $b$ by toothed wheels $e f$ and the pinions $g$, fixed to the shaft.

At $h h$ are shown a pair of strong bars, which are pivot-jointed to the frame $a$ at $i$ and to the belt casing or box $k$ at $j$, so as to permit the belt-casing $k$ to accommodate itself to the unevenness of the ground and find a firm bearing thereon, and so as to be fastened in place by stakes $l$, one at each side of each end of the casing, and the opposite stakes at each end are driven into the ground through sockets $l'$ of the case in reverse ways, as shown, to effect a firm and secure fastening for the belt-case to hold it against the strain of the moving belt. A cross-bar, $m$, braces the bars $h h$ firmly together, and acts, with the said bars $h h$ and joints at $i$ and the stakes $l$, firmly to brace the belt-case $k$ against lateral displacement, the more direct action of the stakes $l$ being to prevent a rising of the belt-case from the ground.

$n$ is the main driving-belt pulley, which is rigidly mounted on the shaft $b$, and from which the belt $o$ passes by its leading or driving side beneath the guide or idler pulleys or rollers $p p$, journaled at opposite ends of the belt-case $k$, thence over the power-transmitting pulley $q$, which may be a drive-pulley of the thrasher or other machine to be driven, or which may connect in any approved way by belt or gearing with the gearing of the said machine. The belt $o$ then passes back by its upper or following side over the pulleys $p p$ and beneath idler pulleys or rollers $r r$ on its way to and over the pulley $n$. The idlers $r r$ are journaled in the belt-case $k$ inside of the pulleys $p p$, and so as to carry the upper side of the belt $o$ low down or toward the lower side of the belt, to allow the belt-casing to be depressed along its central portion, as at $t$, to enable the animals hitched to the sweep to step over the belt-casing with ease, thus avoiding injury both to the animals and the casing by the animals stumbling and falling over the casing.

If desired, stakes $u$ may be driven into the ground through the frame-bars $v$ of the power-pulley $q$, as shown in Fig. 1.

My improved horse-power can readily be set up for use, and be as readily disconnected, and the power may cheaply be made, and is strong and durable. The driving-belt $o$ is fully protected from wear by contact with the ground or with its casing $k$, as the idlers $p r$ keep the belt in tension and clear of the casing, and also prevent wear of the two sides of the belt upon each other. The power may also be closely packed for storage or transportation by folding the frame-bars $h$ and belt-casing $k$ upon their joints $i j$, as will readily be understood.

Having thus described my invention, what I claim as new, and desire to secure by Letters Patent, is—

1. A horse-power constructed with a drive-pulley, $n$, mounted on the main power-shaft $b$, and a belt-casing, $k$, pivot-jointed by bars $h$ to the frame $a$, and said belt-casing being depressed along its central portion, as at $t$, substantially as shown and described.

2. The combination, with the frame $a$, its drive-shaft $b$, having pulley $n$, and the belt $o$, of the casing $k$, hinged to frame $a$ by the bars $h$, and anchored in place by stakes $l$, driven into the ground in reverse ways at opposite sides of the casing, substantially as shown and described.

3. The belt-casing $k$ of a horse-power, having idlers $p$ $r$ journaled therein at opposite ends, depressed centrally at $t$, and having fixed inclined sockets $l'$, through which stakes $l$ may be driven reverse ways for anchoring the casing to the ground, substantially as shown and described.

AUGUST ZASTROW.

Witnesses:
C. C. PRESTON,
ISAAC FUNK, Jr.